(12) United States Patent
Rulseh et al.

(10) Patent No.: US 11,029,681 B2
(45) Date of Patent: Jun. 8, 2021

(54) SEMI-AUTONOMOUS PAYLOAD RETRIEVAL SYSTEM

(71) Applicant: DEERE & COMPANY, Moline, IL (US)

(72) Inventors: David J Rulseh, Dickeyville, WI (US); Jeffery R Kreiling, Dubuque, IA (US)

(73) Assignee: Deere & Company, Moline, IL (US)

( * ) Notice: Subject to any disclaimer, the term of this patent is extended or adjusted under 35 U.S.C. 154(b) by 248 days.

(21) Appl. No.: 16/291,821

(22) Filed: Mar. 4, 2019

(65) Prior Publication Data
US 2020/0285228 A1    Sep. 10, 2020

(51) Int. Cl.
| | | |
|---|---|---|
| G05D 1/00 | (2006.01) | |
| G05D 1/02 | (2020.01) | |
| H04L 12/40 | (2006.01) | |
| B60W 10/04 | (2006.01) | |
| B60W 10/18 | (2012.01) | |
| B60W 10/20 | (2006.01) | |

(52) U.S. Cl.
CPC ......... *G05D 1/0022* (2013.01); *G05D 1/0027* (2013.01); *G05D 1/0278* (2013.01); *H04L 12/40013* (2013.01); *B60W 10/04* (2013.01); *B60W 10/18* (2013.01); *B60W 10/20* (2013.01); *B60W 2710/18* (2013.01); *B60W 2710/20* (2013.01); *G05D 2201/0202* (2013.01)

(58) Field of Classification Search
CPC .. G05D 1/0022; G05D 1/0027; G05D 1/0278; G05D 2201/0202; G05D 1/0011; G05D 1/00; G05D 1/02; G05D 1/0061; G05D 1/021; G05D 1/0891; H04L 12/40013; H04L 12/40; B60W 2710/20; B60W 10/04; B60W 10/18; B60W 10/20; B60W 2710/18; G05B 9/00
See application file for complete search history.

(56) References Cited

U.S. PATENT DOCUMENTS

| | | |
|---|---|---|
| 8,060,283 B2 | 11/2011 | Mott et al. |
| 8,352,112 B2 | 1/2013 | Mudalige |
| 8,392,065 B2 | 3/2013 | Tolstedt et al. |

(Continued)

FOREIGN PATENT DOCUMENTS

| | | | |
|---|---|---|---|
| DE | 102015014861 A1 | 12/2016 | |
| EP | 2589709 A2 * | 5/2013 | ............ E02F 9/2228 |

OTHER PUBLICATIONS

Ola Ringdahl, Automation in Forestry—Development of Unmanned Forwarders, dated May 2011, 44 pages, Umeå University, Sweden.

(Continued)

*Primary Examiner* — Rodney A Butler

(57) ABSTRACT

A semi-autonomous work machine having an operator compartment with a user-input interface; a machine CAN bus configured to receive a local user-input signal from the user-input interface; a controllable subsystem communicatively coupled to the machine CAN bus; a gateway interface controller configured to receive a remote user-input signal from a remote controller remotely located from the work machine, the gateway interface controller further configured to generate a CAN signal based on the remote user-input signal to command and actuate the controllable subsystem using the machine CAN bus, wherein the local user-input signal overrides the remote user-input signal.

18 Claims, 7 Drawing Sheets

(56) References Cited

U.S. PATENT DOCUMENTS

| | | | |
|---|---|---|---|
| 8,510,029 B2 | 8/2013 | Curtis et al. | |
| 8,543,255 B2 | 9/2013 | Wood et al. | |
| 9,146,561 B2 | 9/2015 | Al-Buraiki et al. | |
| 9,165,470 B2 | 10/2015 | Mudalige et al. | |
| 9,296,411 B2 | 3/2016 | Hornberger | |
| 10,114,376 B2 | 10/2018 | Kini et al. | |
| 10,119,830 B2 | 11/2018 | Sakai et al. | |
| 10,120,388 B2 | 11/2018 | Sakai et al. | |
| 2007/0293989 A1* | 12/2007 | Norris | G05D 1/0088 700/249 |
| 2009/0037033 A1 | 2/2009 | Phillips et al. | |
| 2016/0378111 A1 | 12/2016 | Lenser et al. | |
| 2017/0115665 A1* | 4/2017 | Wang | G05D 1/0242 |

OTHER PUBLICATIONS

Ola Ringdahl, Potentials of possible machine systems for directly loading logs in cut-to-length harvesting, 35 pages, Umeå University, Sweden.

Jerome K Vanclay, Future Harvest what might forest harvesting entail 25 years hence, retrieved from a journal, dated 2011, 6 pages, Southern Cross University, Lismore, Australia.

* cited by examiner

SEMI-AUTONOMOUS PAYLOAD RETRIEVAL SYSTEM

CROSS-REFERENCE TO RELATED APPLICATIONS

This application is a continuation-in-part to U.S. application Ser. No. 15/985,088 filed May 21, 2018, the entire contents of which are incorporated herein by reference.

FIELD OF THE DISCLOSURE

The present disclosure generally relates to the control of a work machine. More specifically, but not by limitation, the present disclosure relates to remote control of a work machine using a gateway interface controller.

BACKGROUND

There are a wide variety of different types of equipment, such as forestry equipment, construction equipment, and agricultural equipment. These types of equipment are often operated by an operator and have sensors that generate information during an operation. These types of equipment can often communicate with other systems, work machines, or accessories.

For example, forestry equipment can include a wide variety of work machines such as harvesters, skidders, feller bunchers, forwarders, and swing machines, among others. Forestry equipment can have many different mechanical, electrical, hydraulic, pneumatic, electromechanical (and other subsystems), some or all of which may be controlled by an operator. Some or all of these subsystems communicate information that is obtained from sensors on the machine (and from other inputs). Generally, experienced and talented operators are difficult to find because of the physical demands required and remote areas where logging is performed. Furthermore, the industry has begun to shift from a piecemeal operation to a more centralized approach wherein the felling, delimbing, bucking, forwarding, and sorting operations are performed on-site prior to shipping to a mill yard. Therein lies a need for an efficient means of operating several pieces of equipment wherein the number of operators is not a limitation.

The discussion above is merely provided for general background information and is not intended to be used as an aid in determining the scope of the claimed subject matter.

SUMMARY

This summary is provided to introduce a selection of concepts that are further described below in the detailed description and accompanying drawings. This summary is not intended to identify key or essential features of the appended claims, nor is it intended to be used as an aid in determining the scope of the appended claims.

The present disclosure includes an apparatus and method for payload operations through semi-autonomous control of a work machine.

According to an aspect of the present disclosure, a work machine may comprise an operator compartment with a user-input interface, a machine CAN bus configured to receive a local user-input signal from the user-input interface, a controllable subsystem communicatively coupled to the machine CAN bus, and a gateway interface controller configured to receive a remote user-input signal from a remote controller remotely located from the work machine.

The gateway interface controller may be further configured to generate a CAN signal based on the remote user-input signal to command and actuate the controllable subsystem using the machine CAN bus, wherein a local user-input signal overrides the remote user-input signal. The gateway interface controller may comprise of a transmitter and a receiver configured to communicate with the remote controller.

The remote user-input signal may be configured to provide instruction for a planned path through a series of waypoints.

The remote user-input signal may actuate the controllable subsystem with one or more of a time-delay or a distance window configured for the work machine to maintain a position proximate to the remote controller.

The remote controller may be located on one or more of a hand-held device, a second user-input interface, a second work machine, a remote operator compartment or a cloud source.

The controllable subsystem may comprise one or more of a steering system, a propulsion system, a braking system, a winch system, or an implement control system. The controllable subsystem may comprise of a real-time inclination detection system wherein the speed of the work machine is adjusted based on a real-time inclination of the work machine. A CAN signal for the controllable subsystem is modified based on an object detection from an objection detection device on the work machine.

The work machine may comprise one or more of a skidder, a forwarder, a knuckle boom loader, and a feller-buncher.

The machine CAN bus is configured to receive the remote user-input signal and send a corresponding first CAN signal to a first controllable subsystem and receive a local user-input signal and send a second CAN signal to a second controllable subsystem at the same time.

According to an aspect of the present disclosure, a method for payload operation through semi-autonomous control of a work machine may include one more of the following steps: receiving with a receiver on a gateway interface controller on the work machine an active control request from a remote controller configured to send a remote user-input signal; generating an active control response by the gateway interface controller based on the active control request; sending an active control response by the gateway interface controller to the remote controller, wherein the active control response couples the remote controller to a machine CAN bus on the work machine based on acceptance of the active control request by the gateway interface controller, a controllable subsystem communicatively coupled to the machine CAN bus; receiving with the receiver the remote user-input signal from the remote controller, the remote user-input signal configured to command the controllable subsystem; and relaying the remote user-input signal from the remote controller across the machine CAN bus of the work machine; the remote user-input signal commanding and actuating the controllable subsystem on the work machine.

The method may further comprise overriding the remote user-input signal from a remote controller on the work machine with the local user-input signal from the work machine.

These and other features will become apparent from the following detailed description and accompanying drawings, wherein various features are shown and described by way of illustration. The present disclosure is capable of other and different configurations and its several details are capable of modification in various other respects, all without departing from the scope of the present disclosure. Accordingly, the detailed description and accompanying drawings are to be regarded as illustrative in nature and not as restrictive or limiting.

BRIEF DESCRIPTION OF THE DRAWINGS

The detailed description of the drawings refers to the accompanying figures in which.

DETAILED DESCRIPTION

Figure 1:
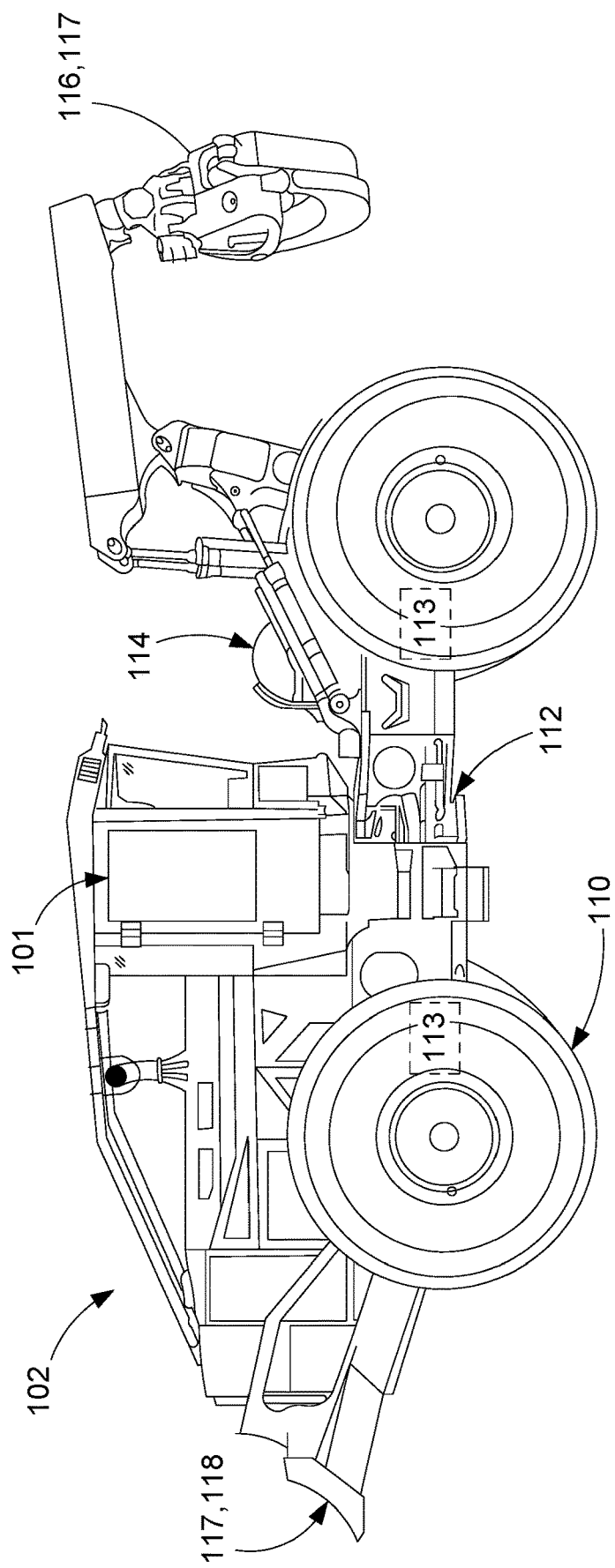
FIG. 1 is a side view of an exemplary work machine.

The embodiments disclosed in the above drawings and the following detailed description are not intended to be exhaustive or to limit the disclosure to these embodiments. Rather, there are several variations and modifications which may be made without departing from the scope of the present disclosure.

A wide variety of different work operations can be performed at a work site and between work sites. Some exemplary work operations at a forestry work site include, but are not to, harvesting a planted material, cutting the stems of the harvested material, removing the branches from the harvested material into piles, loading the piles onto a hauling truck, and transporting the piles to another work site for processing. Many such forestry operations utilize machinery that can perform a variety of functions.

Work machines (such as a mobile machine, or vehicle) often have a wide variety of sensors that sense a variety of different variables such as machine operating parameters, work site characteristics, environmental parameters, etc. In one example, sensor signals are communicated over a controller area network (CAN) bus (or another network, such as an Ethernet network, WiFi, etc.) to various systems on the machine that process the sensed variable to generate output signals (such as control signals or other outputs) based on the sensed variables. Work machines also often have a wide variety of controllable subsystems capable of performing various operations. These subsystems are actuated by receiving user-input signals communicated over the CAN bus. These user-input signals may be local user-input signals which originate from an operator compartment on the work machine, or a remote user-input signal which originate from a remote controller from an accessory or other work machine. Please also note, that operator compartment as disclosed herein may also refer to an operator compartment remotely located from the work vehicle, wherein the work vehicle is unmanned and the operator is remotely stationed and remotely controlling the work vehicle.

Often original equipment manufacturers (OEM) and third-parties develop accessories that interface with work machines. These accessories may have controllers requiring access to the CAN bus of the work machine, for example, to retrieve sensor data or control a machine subsystem. In some instances, when an aftermarket or third-party accessory is attached, it is manually hardwired into the CAN bus. Splicing into the CAN bus wiring, adding components to trick the systems attached to the CAN, and/or adding messages manually to the CAN bus, can be problematic because an accessory may negatively affect the CAN bus and other components attached thereto. For example, the accessory could send a signal that overrides the safety protocols or a signal that harms the CAN bus. Further, hardwiring into a CAN bus can cause physical damages to the CAN bus.

One type of accessory that is very commonly coupled to a work machine is a remote controller. Some exemplary remote controllers are hand-held devices, a second user-input interface, a second work machine, a remote operator compartment, a base station, and a cloud source wherein the cloud source may be coupled to a programmed file laying out sequential steps for working the land. Current remote controllers connect to a work machine and can immediately begin controlling the work machine. This can be problematic or unsafe. For example, a remote controller could send a command that conflicts with a command given by an operator seated in the operator compartment or a button on the remote controller could accidently be actuated.

In accordance with one example, to prevent an accessory from causing an unwanted problem, a gateway interface controller coupled to the work machine is provided. The gateway interface controller interacts with a work machine accessory and isolates the accessory from directly accessing the CAN bus. Predefined messages or signals can be provided for communication of command signals and information between the gateway and accessory. The gateway interface controller can include a processor and logic that filters valid signal from invalid signals, between the accessory and CAN bus. Valid signals will be re-broadcast onto the CAN bus while invalid signals will be ignored and not re-broadcast onto the CAN bus. This way any invalid or potentially damaging signals will be prevented from being communicated on the CAN bus. The gateway interface controller can also protect proprietary or other sensitive information from being extracted off the CAN bus by an attached accessory.

In addition to rebroadcasting of CAN messages, the gateway interface controller can provide priority to the operator by allowing local user-input signals from the operator compartment to override remote user-input signals from a remote controller remotely located from the work machine. Exemplary scenarios where this may be used will be detailed later.

FIG. 1 is a side view of an exemplary work machine 102, in the form of a skidder. It is noted that while present examples are described in the context of a skidder in a forestry application/jobsite, the present systems, components and methods can be utilized in other types of work machines and applications. The term "work machine" or "vehicle" may also interchangeably be used.

Skidder 102 has an operator compartment 101 where an operator is located while operating skidder 102. Skidder 102 has several controllable subsystems that accomplish different functions. These controllable subsystems include propulsion system 110, steering system 112, braking system 113, winch system 114, and implement control system 117

(shown as grapple system 116 and blade system 118). Of course, work machine 102 can comprise other controllable subsystems as well.

Propulsion system 110 propels machine 102 in a forward or rearward direction. As shown, propulsion system 110 includes wheels, however, propulsion system can include tracks (rigid or flexible) or other ground engaging elements, as well. In one embodiment, the propulsion system 110 comprises the combination of an engine controller and an internal combustion engine. The engine controller may control a throttle setting, carburetor, fuel injection system, fuel-metering system or air-metering system, or other fuel delivery system for the internal combustion engine, for example. In another embodiment, the propulsion system 110 comprises an electric motor, a drive motor, an alternating current motor, an induction motor, a permanent magnet motor, a direct current motor, or another suitable motor for propelling a vehicle. Further, the propulsion system 110 may comprise a motor controller (e.g. an inverter, chopper, wave generator, variable frequency oscillator, variable current supply, or variable voltage supply) for controlling the velocity, torque, and direction of rotation of the motor shaft of the electric motor. In yet another embodiment, the propulsion system 110 comprises a hybrid drive system, a parallel hybrid system, or a series hybrid system, in which at least on of an electric motor and internal combustion engine can propel the vehicle. For example, in a parallel hybrid system, the electric motor, the internal combustion engine or both may apply power to one or more wheels (or tracks) of the vehicle. For a series hybrid system, the electric motor typically provides power to one or more wheels of the vehicle.

Steering system 112 allows work machine 102 to change a direction of movement. As shown, steering system 112 includes an articulated steering system, however, steering system 112 may include other steering systems as well. The steering system 112 comprises a hydraulic steering system, an electro-hydraulic steering system, an electromechanical steering system, an electro-mechanical actuator, an electrical steering system, a drive-by-wire steering system or another with an electrical or user input interface for communicating through the CAN bus or otherwise communicating with the vehicle controller. In one embodiment, the user input interface may comprise a sensor for detecting a position of a hydraulic cylinder of the steering system 112 and an actuator for controlling the position of the hydraulic cylinder or other member of the steering system 112 in response to commands from the CAN bus. Although the steering system 112 may use digital messages (e.g. logic level signals) to control steering, in an alternate embodiment the steering system 112 may use analog signals, particularly if the steering system 112 is configured to directly communicate with the CAN bus.

Braking system 113 comprises a hydraulic braking system, an electro-hydraulic braking system, an electromechanical braking system, an electromechanical actuator, an electrical braking system, a brake-by-wire braking system or another braking system with an electrical or electronic control interface for communicating over the CAN bus or otherwise communicating with the vehicle controller. In one embodiment, the electronic control interface may comprise a sensor for detecting a position of a hydraulic cylinder of the braking system 113 and an actuator for controlling or modulating the position of the hydraulic cylinder or other member of the braking system 113 in response to command signals from the CAN bus. Although the braking system 113 may use digital messages (e.g. logic level signals) to control braking, in an alternate embodiment the braking system 113 may use analog signals, particularly of the braking system 113, is configured to directly communicate with the CAN bus or vehicle controller.

Winch system 114 includes a spool and cable to move machine 102 or another object. Winch system 114 can be synchronized with an articulated steering system 112 to align the winch spool perpendicularly with the object it is winching.

The implement control system 117 comprises a blade system 118 and a grapple system 116 in the present embodiment. Blade system 118 includes a blade capable of pushing an aggregate. In some cases, a blade system 118 can be lowered to increase machine 102 stability while operating winch system 114.

Grapple system 116 includes a grapple and a boom capable of lifting and/or dragging a variety of different objects (e.g. logs). The grapple may include a base, left and right tongs, and left and right hydraulic cylinders. The base is coupled to the distal portion of the boom section. The proximal ends of the left and rights tongs are controllable by the left and right hydraulic cylinders to open and close the grapple. The left hydraulic cylinder has a head end coupled to the base, and a piston end coupled to the proximal end of the left tong. The right hydraulic cylinder has a head end coupled to the base, and a piston end coupled to the proximal end of the right tong. The operator can control extension and retraction of the left and right hydraulic cylinders to open and close the grapple. When the left and right hydraulic cylinders are retracted, the proximal ends of the left and right tongs are brought closer together, which pulls apart the distal ends of the left and right tongs which opens the grapple. When the left and right hydraulic cylinders are extended, the proximal ends of the left and right tongs are pushed apart, which brings together the distal ends of the left and right tongs which closes the grapple. The operator can retract the left and right tongs to open the grapple to surround a payload (e.g. trees or other woody vegetation), and then extend the left and right tong cylinders to close the grapple to grab, hold and lift the payload so the machine can move it to another desired location.

Figure 2:
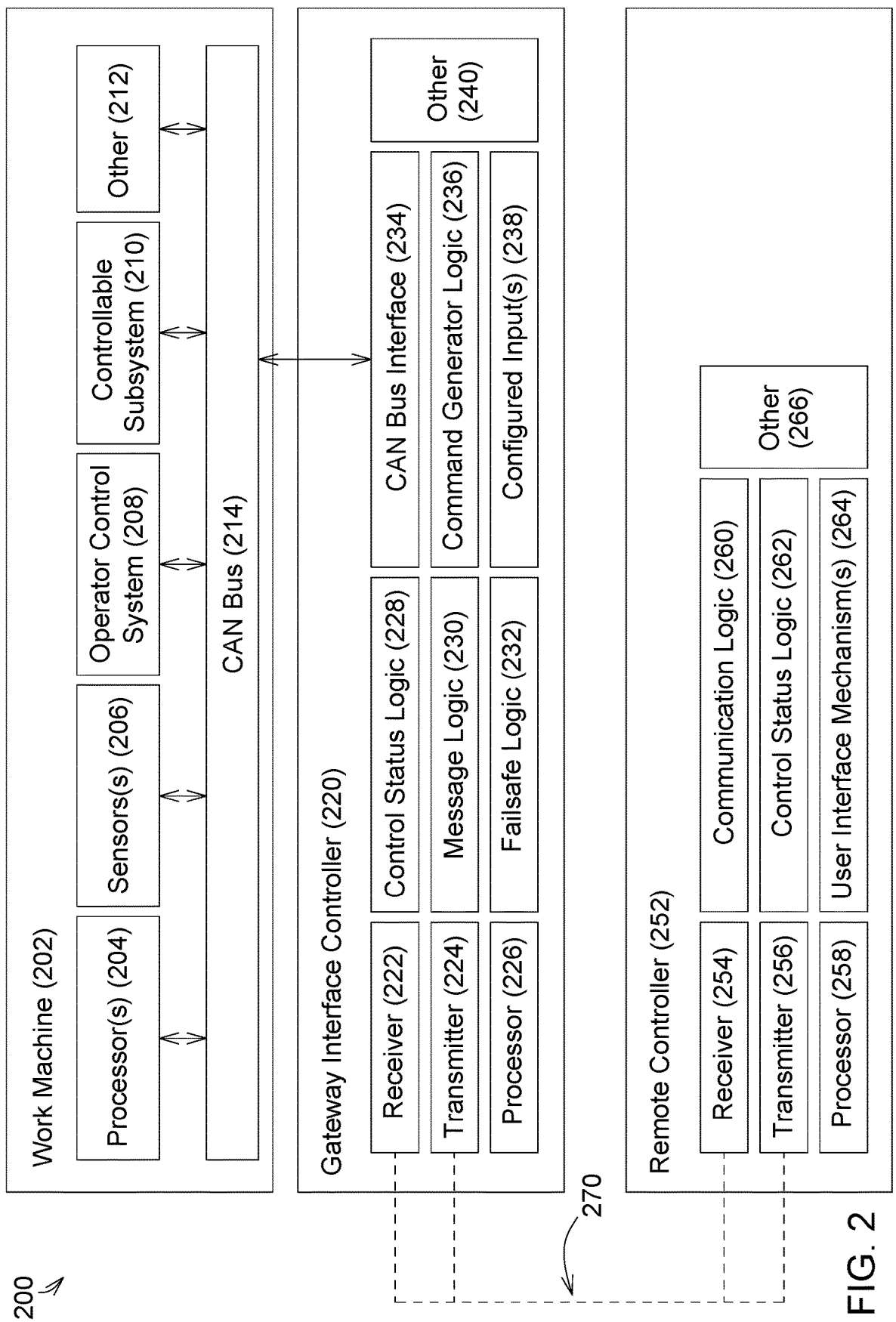
FIG. 2 is a block diagram of an exemplary control architecture of a work machine as it relates to a remote controller.

FIG. 2 is a block diagram of an exemplary control architecture 200 for a work machine 202, such as machine 102 shown in FIG. 1, as it relates to a remote controller 252. Control architecture 200 comprises work machine 202, gateway interface controller 220, and remote controller 252. Before describing these components in further detail, an overview of machine 202 will be provided.

Work machine 202 includes CAN bus 214 that is communicatively coupled (directly or indirectly) to many components of work machine 202. Work machine 202 includes one or more processor(s) 204. As shown, there are one or more sensor(s) 206 coupled to CAN bus 214. Some examples of sensor(s) 206 include odometers, hall effect sensors, strain gauges, cameras, lidars, radars, global positioning systems (GPS), potentiometers, etc. Machine 202 can include operator control system 208 that an operator utilizes to control machine 202. Operator control system 208 can include local user-input interface mechanisms (i.e. command signals from the user-input interface from the operator compartment 101 for an operator in/on machine 202 to interact with machine 202. Some examples of local user-input interface mechanisms include displays, haptic devices, audio devices, levers, pedals, steering wheels, etc. Machine 202 can include a variety of different controllable subsystem(s) 210. Some examples of controllable subsystems are propulsion system 110, steering system 112, winch system 114, and an implement control system 117 (e.g. grapple system 116 and blade system 118), which have been described in greater detail above, with respect to FIG. 1. Work machine 202 can include other components as well, as indicated by block 212.

Gateway interface controller 220 is also communicatively coupled to CAN bus 214 through CAN bus interface 234. In one example, CAN bus interface 234 includes a mechanism that removably or communicatively couples to corresponding mechanism on CAN bus 214 (e.g. a plug and socket connection or terminal connection or wireless connection). Configured inputs 238 allow additional components to be attached to gateway interface controller 220 that can either interact with work machine 202 or remote controller 252. For example, switches or sensors can be physically coupled to configured inputs 238 and their status/value can be sent to remote controller 252.

Gateway interface controller 220 includes processor(s) 226 that execute the functions of variety of different logic components. The functions of logic components of gateway interface controller 220 are described in further detail with respect to FIG. 3. Briefly, control status logic 228 sets a control status of the remote controller 252. Message logic 230 processes signals from, and generates signals to remote controller 252. Failsafe logic 232 checks for certain conditions and based on those conditions sets the control status of the remote controller 252 to an inactive mode (failsafe mode). Command generator logic 236 generates CAN signals that can be communicated over CAN bus 214 (using CAN bus interface 234) to components of work machine 202. As discussed in further detail below, the logic components of gateway interface controller 220 are configured to isolate remote controller 252 from CAN bus 214. Illustratively, isolating remote controller 252 from CAN bus 214 means a signal from remote controller 252 will not be communicated across CAN bus 214 without being checked for validity by gateway interface controller 220.

Figure 4:
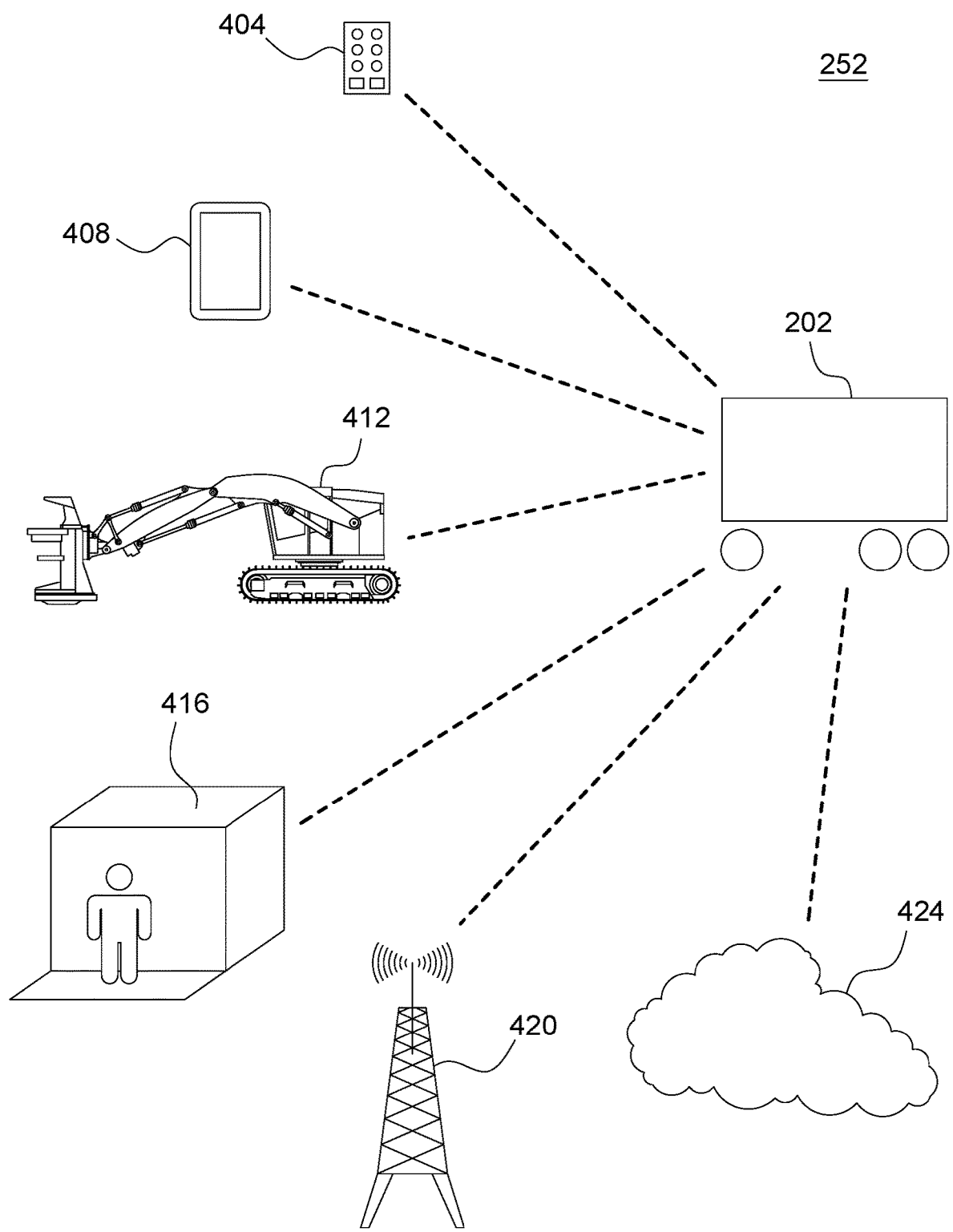
FIG. 4 is a schematic diagram of exemplary remote controllers communicating with a work machine.

Remote controller 252 includes a transmitter 256 and receiver 254 that communicate with transmitter 224 and receiver 222 of gateway interface controller 220. This communication is illustrated by connection 270. Connection 270 can be a wired or wireless connection. Some examples of wireless connections include WiFi, Bluetooth, radiofrequency, etc. Remote controller 252 also illustratively includes a processor 258 that executes functions of communication logic 260 and control status logic 262. Communication logic 260 generates signals to and processes signals from gateway interface controller 220. Control status logic 262 generates indications of the current control status to a user of remote controller 252. Remote controller 252 illustratively includes user interface mechanism(s) 264. User interface mechanism(s) can include buttons, haptic devices, audio devices, etc. Some examples of user interface mechanism(s) are shown in FIG. 4. Remote controller 252 can include other items as well, as indicated by block 266.

Figure 3:
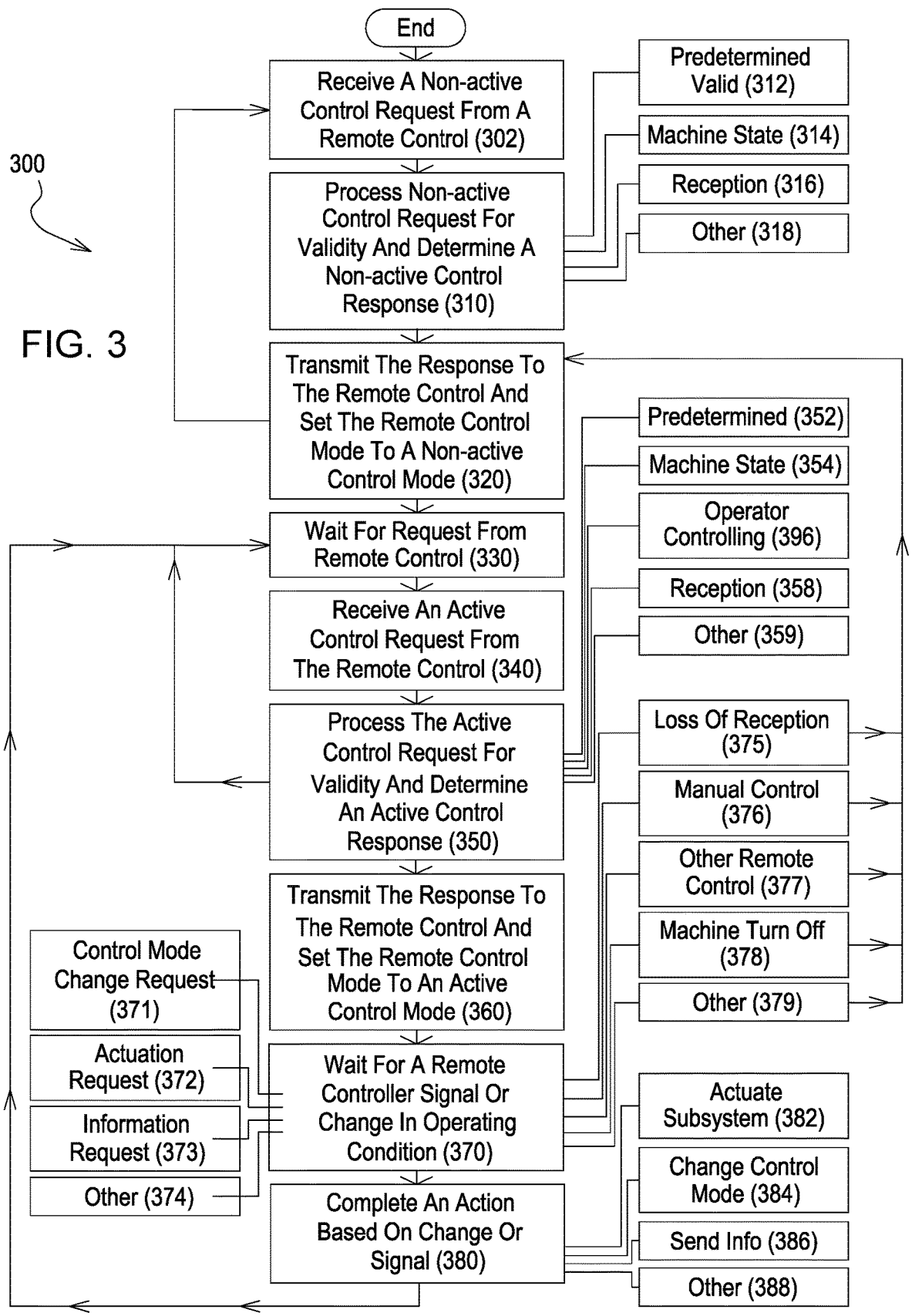
FIG. 3 is a flow chart showing an exemplary method of remotely controlling a work machine.

FIG. 3 is a flow chart showing an example method 300 of remotely controlling a work machine. Method 300 begins at block 302 where gateway interface controller 220 receives a non-active control request from remote controller 252. This non-active control request is indicative of remote controller 252 requesting to be put in a non-active control mode. Illustratively, the non-active control mode comprises a mode where remote controller 252 is connected to gateway interface controller 220, but any machine control command generated by remote controller 252 is ignored, in terms of actuation/execution on machine 102, by gateway interface controller 220 and is not executed by work machine 202.

At block 310, the non-active control request from remote controller 252 is processed for validity by message logic 230, based on at least one validation criterion. A validation criterion can include the non-active control request corresponding to one of plurality of predetermined requests, as indicated by block 312. For example, a request may be compared to a list of predetermined valid requests. A validation criterion can also include the machine being in a proper state, as indicated by block 314. A machine state can be indicative of a variety of different things. For example, a machine state can be indicative of the machine being manually controlled by an operator in operating compartment 101.

After the non-active control request is validated, message logic 230 generates a response to the non-active control request. The response is indicative of granting or denying the non-active control request. A response can also include justification information, indicative of the reason the non-active control request was denied or granted. For example, justification information may indicate the non-active control request was denied because it was in an improper format that did not correspond to one of a plurality predetermined requests.

At block 320, control status logic 228 sets the control mode to a non-active control mode and transmitter 224 transmits the non-active control response to the remote controller 252.

At block 330, gateway interface controller 220 waits for additional requests from remote controller 252. During this time, there may be intermittent communication between remote controller 252 and gateway interface controller 220, for example, to monitor the quality or reception of connection 270.

At block 340, gateway interface controller 220 receives an active control request from remote controller 252. This active control request is indicative of remote requesting to be in an active control mode. Illustratively, an active control mode is a mode where remote controller 252 is connected and remote controller 252 is able to send remote user-input signals 730 (shown in FIG. 7) that, if valid, are re-broadcast onto CAN bus 214 and can be executed by work machine 202.

At block 350, the active control request from remote controller 252 is processed for validity by message logic 230 based on one or more validity criterion. The validation criterion can represent a plurality of predefined requests, and validating the active control request includes determining that the active control request corresponds to one of plurality of predetermined requests, as indicated by block 352. For example, predetermined requests can be in a specific signal format. Validity criteria can also include the machine being in a proper machine state, as indicated by block 354. For example, a machine state may be indicative of an operator in operating cab 101 or the machine 202 being in a low power state.

After the active control request is validated, message logic 230 generates an active control response to the active control request. The response is indicative of granting or denying the active control request. A response can also include justification information indicative of the reason the active control request was denied or granted. For example, justification information may indicate the active control request was denied because it was determined an operator is in manual control of a particular controllable subsystem 210 or of the work machine 202. In some instances, and depending on need, the machine CAN bus 214 may be configured to receive a remote user-input signal 730 and generate a corresponding first CAN signal 775 to command a first controllable subsystem 210, and receive a local user-input signal 750 and generate a second CAN signal 775 to command a second controllable subsystem 210 at the same time.

At block 360, transmitter 224 transmits the active control response to the remote controller 252.

At block 370, gateway interface controller 220 waits for additional messages or changes in operating condition. Some examples of messages are indicated by blocks 371-374. A message can be indicative of a request for the remote controller 252 to be put in a different control mode, as indicated by block 371. For example, remote controller 252 request to be in a non-active control mode. A message can be indicative of a request for an actuation of a controllable subsystem 210, as indicated by block 372. For example, a request for an actuation of a controllable subsystem 210 could be retracting of winch system 114 or free spooling of winch system 114. A message can be indicative of a request for machine information, as indicated by block 373. For example, remote controller 252 can request the current RPMs of an engine on work machine 202. (Gateway interface controller 220 can retrieve information from other components on CAN bus 214 and relay it to remote controller 252.) A message can include other requests or information as well, as indicated by block 374.

Some examples of changes in operating conditions are indicated by blocks 375-379. A change in operating condition can be a loss of reception or connection between gateway interface controller 220 and remote controller 252, as indicated by block 375. A change in operating condition can be an operator in operator compartment 101 manually controlling machine 202, as indicated by block 376. A change in operating conditions can be another remote control connecting to machine 202, as indicated by block 377. Changes in operating conditions can be work machine 202 powering down, deactivating, turning off, etc., as indicated by block 378. Change in operating conditions may be a drop in environmental temperatures and therefore a required increase in idle speed for a period of time prior to propelling machine and/or engaging implement 113. There may be other changes in operating conditions as well, as indicated by block 379.

At block 380, gateway interface controller 220 completes an action. An action can include actuating one or more of controllable subsystems 210 as indicated by block 382. For example, winch system 114 can be actuated to retract a cable. As another example, steering subsystem 112 can be actuated to turn or articulate a portion of work machine 202. Action can be completed by generating a CAN signal 775 with command generator logic 236.

An action can also include changing the control mode from an active mode to a non-active mode, as indicated by block 384. Connection may include sending information to remote controller 252, as indicated by block 386. For example, gateway interface controller 220 sends a signal to another component of work machine 202 and receives information about the component (e.g. the RPMs of an engine, winch retraction speed, etc.) which is then sent to remote controller 252. An action can comprise other things as well, as indicated by block 388.

FIG. 4 is a schematic diagram of exemplary remote controllers 400 for a work machine 202. Remote controllers 400 includes a variety of different user interface mechanisms. Remote controllers 400 may comprise on one or more of a hand-held device 404, a second user-input interface 408, a second work machine 412, a remote operator compartment 416, a base station 420, and a cloud source 424.

Figure 5:
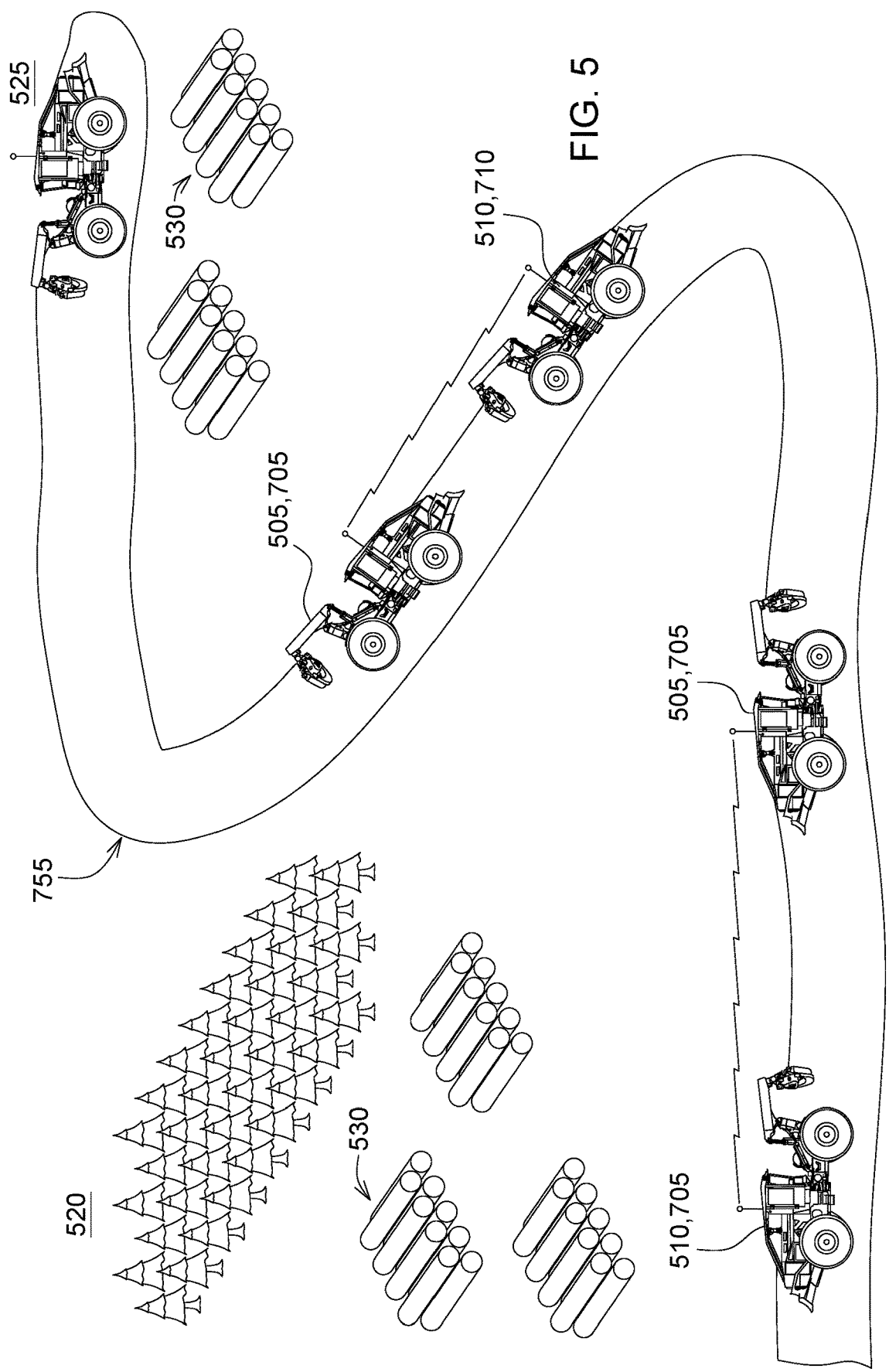
FIG. 5 is a first exemplary application using the above-mentioned method and machine.
Figure 7:
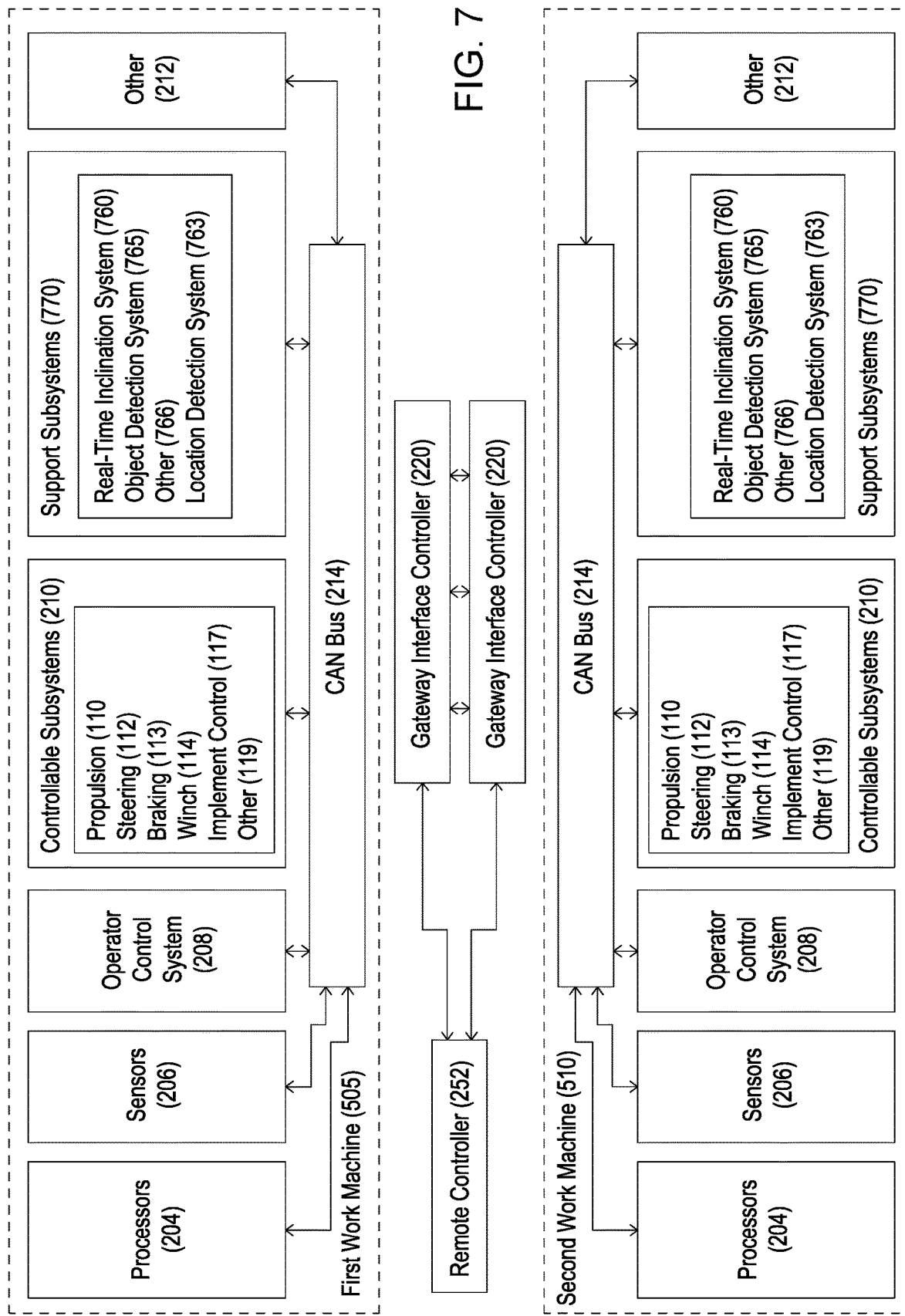
FIG. 7 is a block diagram showing one example of a computing environment that can be used in the work machine and/or in the architectures shown in the previous figures.

Now turning to FIGS. 5 and 7 with continued reference to FIGS. 1 through 4, FIG. 5 demonstrates a first exemplary application using the above-mentioned method and machine(s). The application relates to retrieving logs 530 (one form of many of a payload, also note that not all logs are identified in drawing) from a felling site 520 and transporting them to a processing site 525 where logs are delimbed and cut to length for shipment. The forestry site uses at least two work machines 202 capable of carrying logs (e.g. skidders, forwarders, etc.). A first work machine 505 is loaded with logs 530. A second machine 510 is loaded with logs 530. The application of above-mentioned system advantageously requires a single operator to perform work that generally requires 2 or more operators. The operator may load each respective work machine through one of many remote controllers 400 such as a hand-held device (404, 406) or directly from the operator compartment 101 from the work machine 202. While this sole operator remains seated in a first work machine 505 (interchangeably referred to as the leader work machine 705), the second work machine 510 (interchangeably referred to as the follower work machine 710) may remain unmanned during transport from a felling site 520 to a processing site 525. Note that although the first work machine 505 has been designated as leader work machine 705, second work machine 510 may function as the leader work machine 710, and therefore reversing the process. To initiate this process, when the two work machines (505, 510) are loaded with logs 530 (may also be referred to as payload) the operator may activate follower mode 715 (shown in FIG. 7) on the second work machine 510 through the gateway interface controller 220, and begin moving towards the processing site 525. The follower work machine 710 receives and processes the active control request from the leader work machine 705. Remote user-input signals 730 from the leader work machine 705 or another remote controller 400 actuates the controllable subsystem 210 on the follower work machine 710 with one or more of a time-delay 735, a distance window 740 configured for the follower work machine 710 to maintain a position proximate to the follower work machine 705, and/or using a global-positioning system 720. These remote user-input signals 730 transmitted from the leader work machine 705, may be or repeat local user-input signals 750 on the leader work machine 705, thereby advantageously allowing one operator to simultaneously control the follower work machine 710 and the leader work machine 705. The remote user-input signals 730 may also be configured to provide instructions for a planned path 755 through a series of waypoints transmitted from the leader work machine's 705 global positioning system, a cloud source 424 or base station 420. A waypoint is an intermediate point or place on a route or line of travel. The follower work machine 710 will continue to follow the leader work machine 705 at a pre-defined distance until follower mode 715 is deactivated by the operator. The operator may perform this function by deactivating follower mode 715, or moving to the operator compartment 101 located on the follower machine 710 and directly operating the follower machine 710 from there. By sending local user-input signals 750 to the CAN bus 214 on the follower machine 710, follower mode may be de-activated 715. Alternatively, a second operator may operate the follower work machine 710, and the follower work machine may be operated with both remote user-input signals 730 and local user-input signals 750 so long as the signals are not conflicting which can be determined by failsafe logic 232 or other 240. At the processing site 525, the operator(s) unloads both the leader 705 and follower work machines 710. When both work machines are empty, the operator may activate follower mode 715 on the follower work machine 710 and begin driving back to the felling site 520.

Additional safety features incorporated into the work machine 202 to improve function and safety for unmanned work machines 610 include a real-time inclination system 760 and an object detection system 765. The support subsystems 770 comprising of a real-time inclination system 760 may impact a controllable subsystem 210 such as the propulsion system 110 of the work machine 202 wherein the propulsion system 110 is adjusted based on a real-time inclination of the work machine 202. The real-time inclination of the work machine may include incline in the direction of travel of the work machine, and/or incline in a direction perpendicular to the direction of travel of the work machine. In another instance, the real-time inclination system may use a gyro to compensate for the work machine's roll and pitch when driving on uneven ground and impact the CAN signal 775 for a controllable system 765 on the work machine. The object detection system 765 may include cameras, LIDAR, radar, heat detection technology, infrared, to name a few.

Figure 6:
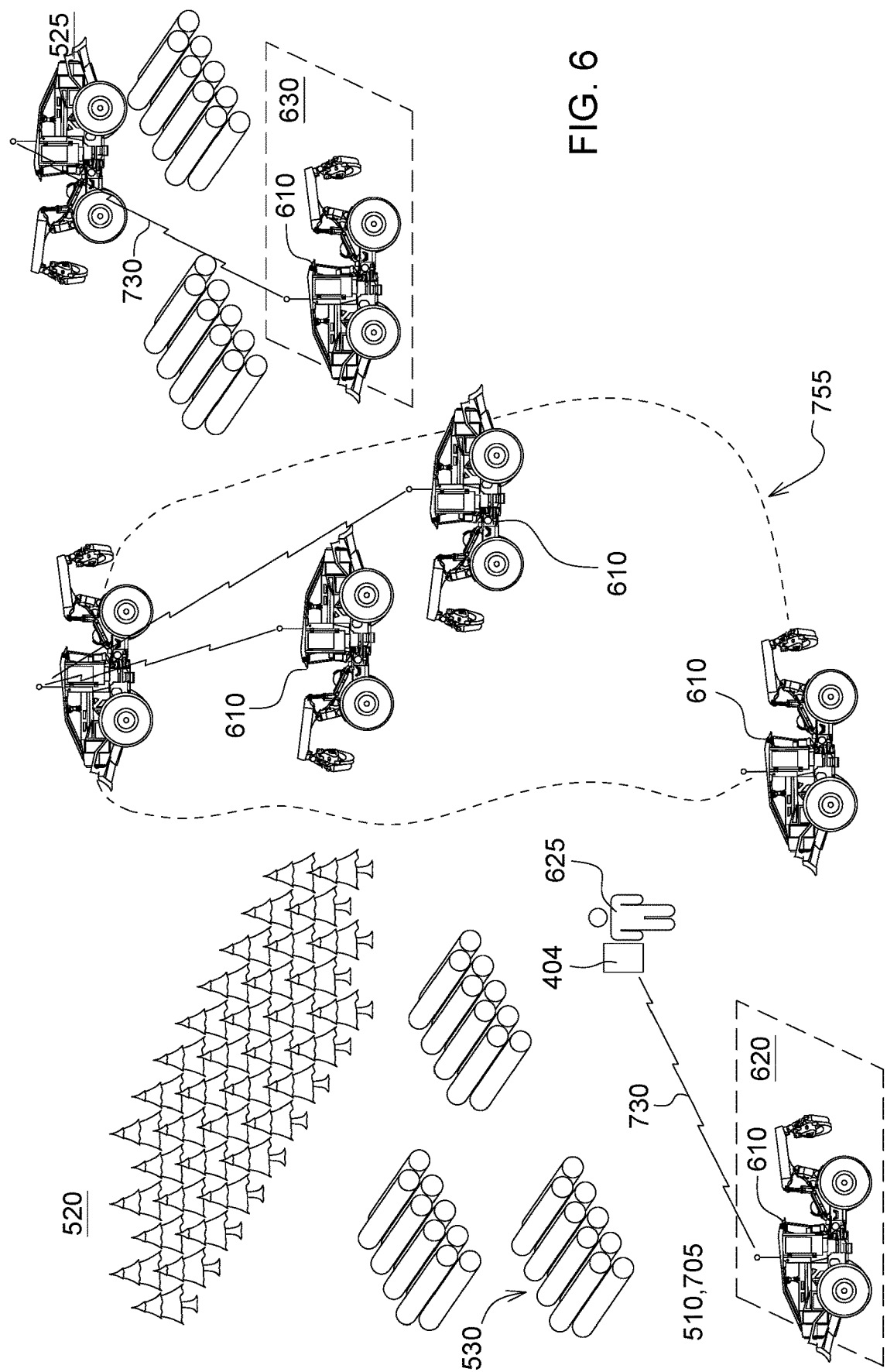
FIG. 6 is a second exemplary application using the above-mentioned method and machine.

FIG. 6 demonstrates a second exemplary application using the above-mentioned system, method and machine(s). Here, an unmanned work machine 610 may wait at a pre-defined holding site 620 at the felling site 520, either immediately before or after loading logs 530 (i.e. payload) onto work machine 202. Holding sites (620, 630) are beneficial in that they provide a known "safe zone" with a clear and precise identification of location. The work machine 202 may stop at a holding site (620, 630) allows the work machine 202 to recalibrate its location wherein the work machine's support subsystem 770, the location detection system 763 is updated. This may be advantageous in remote areas where GPS is inaccessible. The recalibration may be with respect to a base station 420 in the forestry site or another more immobile reference.

In FIG. 6, the first operator 625 at the felling site 520 may communicatively couple to the unmanned work machine 610. The first operator may user remote user-input signals 730 from a remote controller 400 (one of many types as outlined in FIG. 4A-4F) to download a planned path 755 and direct the unmanned work machine 610 to the processing site 525 through the planned path 755. The planned path may be through GPS coordinates or memory accumulated of a prior driven path. The unmanned work machine 610 (or alternatively a work machine where an operator passively controls the work machine) then travels to a processing site 525. Upon arrival at the processing site 525, the unmanned work machine waits at a second holding site 630 until a second operator at the processing site communicatively couples to the unmanned machine 610. Upon doing so, the second operator directs the unmanned machine 610 to unload the logs 530 at the processing site 525. When completed, the second operator 635 may direct the unmanned machine 610 to return to the felling site 520, where the unmanned work machine 610 will wait for direction at holding site 620 until the next round. Using the above-mentioned machine and method, advantageously reduces the number of required operators at a forestry and/or construction site while increasing productivity rates. The productivity rates may be defined as payload moved per hour, payload moved per operator, for example.

FIG. 7 is a block diagram showing one example of a computing environment that can be used in the work machine and/or architectures shown in the previous figures.

The terminology used herein is for the purpose of describing particular embodiments or implementations and is not intended to be limiting of the disclosure. As used herein, the singular forms "a", "an" and "the" are intended to include the plural forms as well, unless the context clearly indicates otherwise. It will be further understood that the any use of the terms "has," "have," "having," "include," "includes," "including," "comprise," "comprises," "comprising," or the like, in this specification, identifies the presence of stated features, integers, steps, operations, elements, and/or components, but does not preclude the presence or addition of one or more other features, integers, steps, operations, elements, components, and/or groups thereof.

The references "A" and "B" used with reference numerals herein are merely for clarification when describing multiple implementations of an apparatus.

One or more of the steps or operations in any of the methods, processes, or systems discussed herein may be omitted, repeated, or re-ordered and are within the scope of the present disclosure.

While the above describes example embodiments of the present disclosure, these descriptions should not be viewed in a restrictive or limiting sense. Rather, there are several variations and modifications which may be made without departing from the scope of the appended claims.

What is claimed is:

1. A semi-autonomous work machine comprising:
an operator compartment with a user-input interface;
a machine CAN bus configured to receive a local user-input signal from the user-input interface;
a controllable subsystem communicatively coupled to the machine CAN bus;
a gateway interface controller configured to receive a remote user-input signal from a remote controller remotely located from the work machine, the gateway interface controller further configured to generate a CAN signal based on the remote user-input signal to command and actuate the controllable subsystem using the machine CAN bus,
wherein the local user-input signal overrides the remote user-input signal and,
wherein the machine CAN bus is configured to receive the remote user-input signal and generating a corresponding first CAN signal to command a first controllable subsystem and receive the local user-input signal and generate a second CAN signal to a second controllable subsystem at the same time.

2. The semi-autonomous work machine of claim 1, wherein the gateway interface controller comprises a transmitter and a receiver configured to communicate with the remote controller.

3. The semi-autonomous work machine of claim 1, wherein the remote user-input signal is configured to provide instructions for a planned path through a series of waypoints.

4. The semi-autonomous work machine of claim 1, wherein the remote user-input signal actuates the controllable subsystem with one or more of a time-delay, a distance window configured for the work machine to maintain a position proximate to a second work machine, and a global-positioning system.

5. The semi-autonomous work machine of claim 1, wherein the controllable subsystem may comprise one or more of a steering system, a propulsion system, a braking system, a winch system, and an implement control system.

6. The semi-autonomous work machine of claim 1, wherein the work machine further comprises a support subsystem, the support subsystem comprising of a real-time inclination detection system, the CAN signal for the controllable subsystem modified based on a real-time inclination of the work machine.

7. The semi-autonomous work machine of claim 1, wherein the work machine further comprises a support subsystem, the support subsystem comprising an object detection system, the CAN signal for the controllable subsystem modified based on object detection from an object detection device on the work machine.

8. The semi-autonomous work machine of claim 1, wherein the remote user-input signal on the work machine may be configured to imitate a steering angle of a leader work machine, move in a same direction of the leader work machine, or auto-correct towards a path of the leader work machine if the machine is not on a correct path.

9. A method for payload operations through semi-autonomous control of a work machine, the method comprising:
receiving with a receiver on a gateway interface controller on the work machine an active control request from a remote controller configured to send a remote user-input signal;
generating an active control response by the gateway interface controller based on the active control request;
sending an active control response by the gateway interface controller to the remote controller, wherein the active control response couples the remote controller to a machine CAN bus on the work machine based on acceptance of the active control request by the gateway interface controller, a controllable subsystem communicatively coupled to the machine CAN bus;
receiving with the receiver the remote user-input signal from the remote controller, the remote user-input signal configured to command the controllable subsystem; and
relaying the remote user-input signal from the remote controller across the machine CAN bus of the work machine; the remote user-input signal commanding and actuating the controllable subsystem on the work machine.

10. The method of claim 9, wherein the gateway interface controller comprises a transmitter and receiver configured to communicate with the remote controller.

11. The method of claim 9, wherein the remote user-input signal may be configured to provide instructions for a planned path through a series of waypoints.

12. The method of claim 9, wherein actuating the controllable subsystem on the work machine comprises one or more of a time-delay, a distance window configured for the work machine to maintain a position proximate to a leader work machine.

13. The method of claim 9, wherein the controllable subsystem comprises one or more of a steering system, a propulsion system, a braking system, a winch system, and an implement control system.

14. The method of claim 9, wherein the remote user-input signal on the work machine may be configured to imitate a steering angle of a leader work machine, move in a same direction of the leader work machine, or auto-correct towards a path of the leader work machine if the machine is not on a correct path.

15. The method of claim 9 further comprises modifying the remote user-input signal based on an object detection signal, the objection detection signal coming from an objection detection device coupled to the work machine.

16. The method of claim 9, wherein the method further comprises overriding the remote user-input signal from the remote controller on the work machine with a local user-input signal from the work machine.

17. The method of claim 9, wherein the remote controller is one or more of a hand-held device, a second user-input interface, a second work machine, a remote operator compartment, a base station, and a cloud source.

18. The method of claim 9, wherein the work machine further comprises a location detection system communicatively coupled to the machine CAN bus, the location detection system recalibrating the location of the work machine at a holding site.

* * * * *